United States Patent [19]

Koyasu

[11] Patent Number: 4,603,335

[45] Date of Patent: Jul. 29, 1986

[54] TIME RECORDER FOR VERTICAL AND HORIZONTAL USE

[75] Inventor: Yoshio Koyasu, Yokohama, Japan

[73] Assignee: Amano Corp., Yokohama, Japan

[21] Appl. No.: 717,291

[22] Filed: Mar. 28, 1985

[51] Int. Cl.[4] ........................ G07C 1/06; G01D 13/00

[52] U.S. Cl. .................................... 346/17; 248/27.1; 346/82; 346/145; D10/41

[58] Field of Search .................................... 346/82–86, 346/95, 96, 134, 145, 17; D10/41; 73/431; 324/115, 156; 340/815.01, 815.14; 368/223; 248/27.1; 116/303, 304

[56] References Cited

U.S. PATENT DOCUMENTS

| | | | |
|---|---|---|---|
| D. 277,170 | 1/1985 | Sugiyama | D10/41 |
| 3,612,851 | 10/1971 | Fowler | 324/156 X |
| 3,893,028 | 7/1975 | Febure | 324/115 |
| 4,476,721 | 10/1984 | Hochreuther | 73/431 |
| 4,494,127 | 1/1985 | King | 346/82 |

*Primary Examiner*—Joseph W. Hartary

[57] ABSTRACT

A time recorder which can be used for both vertical and horizontal states is disclosed. It has a box shaped main body just as a usual time recorder. The main body has an end face in which an insertion slot for inserting a time card is formed. Adjacent to this end face, there is formed an inclined portion. This inclined portion which is integrally connected to the end face constitutes a mounting portion. A panel including an indicator and an operation apparatus mounted thereon is detachably fitted to the mounting portion. By merely reassembling the recorder by shifting the panel at 180° when mounting to the inclined portion of the main body, the time recorder can be used in both vertical and horizontal states.

3 Claims, 3 Drawing Figures

TIME RECORDER FOR VERTICAL AND HORIZONTAL USE

BACKGROUND OF THE INVENTION

1. Field of the Invention

This invention relates to a time recorder which can be located in both vertical and horizontal states.

2. Description of the Prior Art

The main stream of conventional time recorders is of a vertical type in which the card inserting slot is opened in the top and a panel for operation and display is disposed facing upward. In this prior art, since the time card is required to be inserted in the vertical direction with respect to said card inserting slot, it is not adequate, or in other words, practically impossible to locate the time recorder in such a place as for example, under a counter table or under a shelf board, where the height is restricted, since if located in such a place, the inserting operation of the time card becomes impossible. Thus, the place for location of the prior art time recorder is limited.

In view of the above, an attempt is made to use the vertical type time recorder in a horizontal state when used in such a place where the height is restricted. However, a time recorder is generally required, as its nature, to be always readily confirmed with figures and/or characters printed on a time card inserted by a user (printer). Furthermore, since the panel is disposed in such a manner as to be faced toward the user, when the recorder is located in a horizontal state with the printing surface being faced upward, the panel is positioned upside down. On the contrary, when the recorder is located in a horizontal state as such that the panel will be correctly faced forward, there arises another problem. That is, the printing surface of the time card is faced backward.

In order to solve the above problems and to respond to the user's diverse needs, a horizontal type time recorder is developed, in which the time card is allowed to be inserted in the horizontal direction. However, even in this case, there still remain such problems as that two kinds of time recorders, i.e., one for a horizontal type and the other for a vertical type, are required to be manufactured. This means that the number of component parts required is large and the manufacturing costs are high. Above all, there is such a serious problem as that no one knows whether or not the place where the time recorder is going to be located is subject to height restriction until he actually goes to that place for confirmation. Accordingly, there arise such problems as that the delivery time of a time recorder is delayed since the time recorder once delivered is required to be brought back to the factory because of incorrect selection of the type of time recorder, and that the delivery of a correct time recorder cannot be fulfilled because of the shortage of the particular type of time recorder.

The present invention was accomplished in view of the above problems inherent to the prior art time recorder.

SUMMARY OF THE INVENTION

It is therefore a general object of the invention to provide a time recorder which can be located almost in any places with a least possible reassembling work.

A specific object of the present invention is to provide a time recorder which can be used in both vertical and horizontal states without changing parts and without using additional parts.

Another object of the present invention is to provide a time recorder which can be easily reassembled at a place where the recorder is to be located in accordance with conditions there and a purchaser's requirement.

A further object of the present invention is to provide a time recorder for both horizontal and vertical use which is low at manufacturing costs.

In order to achieve the above objects, there is essentially provided a time recorder comprising a time recorder for both vertical and horizontal use comprising a recorder main body formed in a box shape including an end face with an insertion slot formed therein for inserting a time card therethrough; a mounting portion integrally connected to said end face in an inclined state; and a panel removably fitted to said mounting portion and including an indicator and an operation apparatus mounted thereon, said panel being shiftable in its direction at 180°, so that the recorder main body can be used both in vertical and horizontal states.

These and other objects and features of the present invention will become apparent to those skilled in the art upon reading the following detailed description with reference to the accompanying drawings in which:

DETAILED DESCRIPTION OF THE EMBODIMENT

A preferred embodiment of the present invention will be described hereunder with reference to the accompanying drawings.

Figure 3:
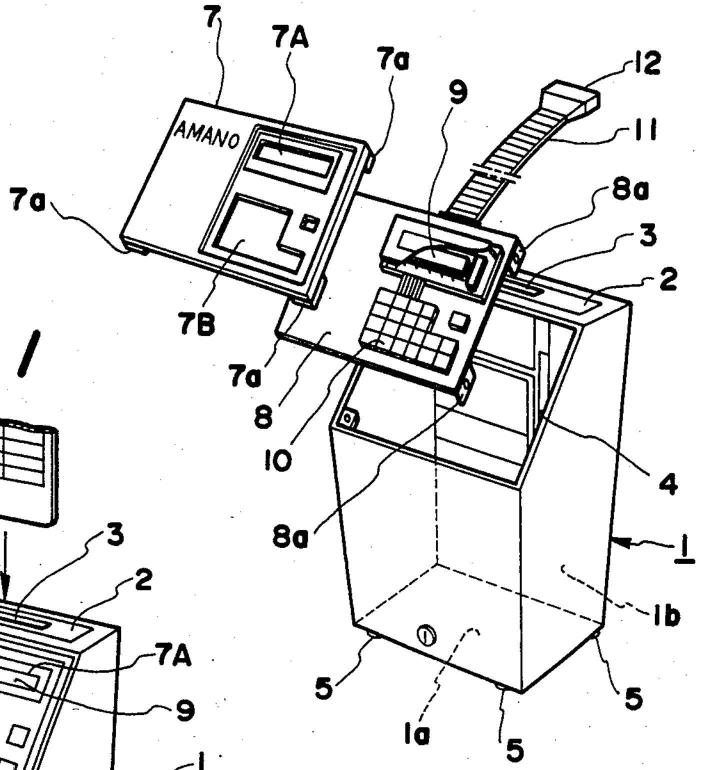
FIG. 3 is an exploded perspective view of the above.
Figure 1:
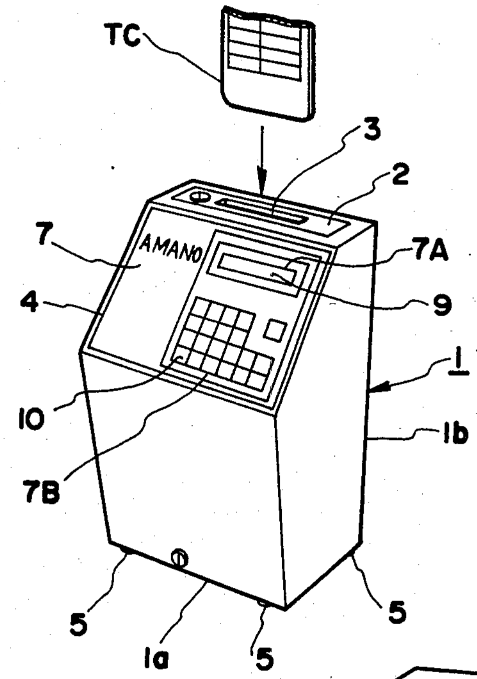
FIG. 1 is a perspective view of a preferred embodiment of a time recorder according to the present invention showing when used in its vertical state.
Figure 2:
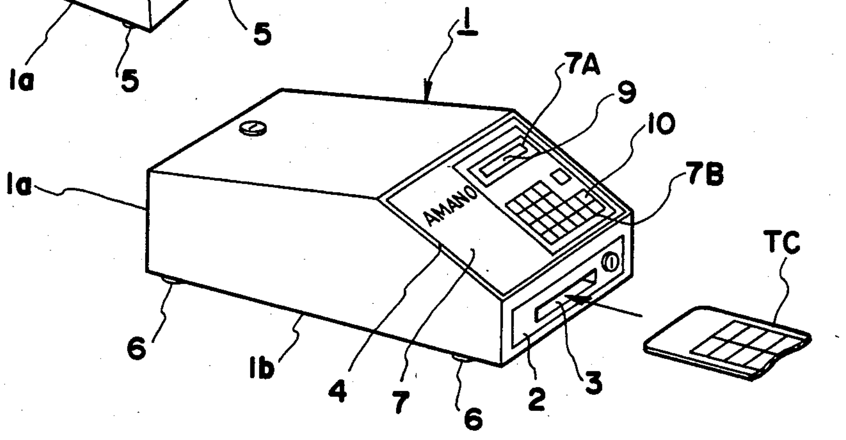
FIG. 2 is likewise a perspective view but showing when used in its horizontal state.

A box type recorder main body generally designated by numeral 1 is formed at its one end face 2 (upper end in FIG. 1 and FIG. 3, but front end in FIG. 2) with an insertion slot 3 formed therein for inserting a time card TC therethrough. Provided within the inside of said insertion slot 3 and also within the recorder main body 1 is a printer (not shown) adapted to print work data on the time card TC. 4 denotes a mounting portion which is integrally connected to said end face 2 as shown in FIG. 3. Said mounting portion 4 disposed in an inclined state at desired angles with respect to said end face 2 as shown in FIG. 1 through FIG. 3. Also, in FIG. 1 and FIG. 3, 5 denotes foot rubbers attached to every corners of a base 1*a* at a time when the recorder main body 1 is used in its vertical state as shown in FIG. 1 and FIG. 3. In FIG. 2, 6 denotes likewise foot rubbers attached to every corners of a base 1*b* (back in FIG. 1 and FIG. 2) at a time when the recorder main body 1 is used in its horizontal state as shown in FIG. 2.

In each of FIG. 1 through FIG. 3, 7 denotes a panel removably fitted to said inclined mounting portion 4 of said recorder main body 1. 8 denotes a ten key bracket mounted on said mounting portion 4 disposed under said panel 7 in a superposed relation with respect to each other. Mounted on the bracket 8 are an indicator 9 such as for example a liquid crystal indicator, and an operation apparatus 10 such as a ten key switch. Said panel 7 is formed with mounting holes 7A and 7B for mounting said indicator 9 and operation apparatus 10.

11 denotes a flexible cord for connecting said indicator 9 and operation apparatus 10 to a main control apparatus (not shown) mounted within said recorder main body 1. 12 denotes a socket attached to the tip of the cord 11.

For the purpose of vertical or horizontal use of the time recorder, said panel 7 and said ten key bracket 8 can be changed with the directions at 180°, respectively, with respect to the mounting portion 4 of the recorder main body 1 as shown in FIG. 1 and FIG. 2.

With the above constitution of the present invention, when a time recorder assembled for a vertical use as shown in FIG. 1 is to be reassembled for use in a horizontal state as shown in FIG. 2, firstly, the panel 7 and the ten key bracket 8 are removed from the mounting portion 4 of the recorder main body 1 by removing machine screws as shown in FIG. 3. Then, the flexible cord 11 is removed from the main control apparatus. Thereafter, both panel 7 and ten key bracket 8 are shifted at 180° and the flexible cord 11 is connected to the main control apparatus. On the other hand, the panel 7 and ten key bracket 8 which have been shifted at 180° are mounted to the mounting portion 4. In this way, the time recorder can be reassembled to be suitable for use in a horizontal state as shown in FIG. 2.

In the time recorder which has been reassembled to be suitable for use in the horizontal state as described in the foregoing, the time card TC can be horizontally inserted into the insertion slot 3 formed in the front surface with the printing surface facing upward. Also, the panel 7 mounted with the indicator 9 and operation apparatus 10 is set in such a manner as to be able to confirm the display and to effect various operations at the front side of said recorder main body 1 as usual. On the contrary, when a time recorder assembled for use in a horizontal state as shown in FIG. 2 is to be reassembled for use in a vertical state as shown in FIG. 1, contrary to the above, the panel 7 and ten key bracket 8 are shifted at 180° and then remounted to the mounting portion 4.

As described in the foregoing, according to a time recorder for both horizontal and vertical use of the present invention, the time recorder can be assembled for use as a usual vertical type time recorder which can be located on a desk or can be hung on the wall. It can also be reassembled for use as a horizontal type time recorder which can be located in such a place as under a counter table or on a shelf board where the height is restricted, without changing parts and without using additional parts and by merely shifting the direction of the panel at 180° to be remounted to the mounting portion. Besides, the reassembling work is extremely simple and anybody can do it at a place where the time recorder is to be located with ease. Accordingly, such a nuisance job as to check the locating place to find whether a horizontal or vertical type of time recorder is suitable in advance and then return to the factory to pick up the right model for delivery is no more required. Instead, the time recorder according to the present invention has such an advantage as that it can be readily reassembled at the place where the time recorder is to be located according to the conditions at that place and also to the purchaser's requirements. Moreover, since it is no more required to make parts for exclusive use of the vertical type or horizontal type time recorder, and since parts can be commonly used, the invented time recorder is extremely advantageous from the economical view point as well. As apparent from the foregoing description, the invented time recorder is simple in its constitution and yet is an epoch making device.

While a preferred embodiment of the present invention has been described in the foregoing, it is to be understood that the present invention is not limited to the above embodiment. Instead, several modifications may of course be made within the scope of the present invention.

What is claimed is:

1. A time recorder for both vertical and horizontal use comprising:
   - a recorder main body formed in a box shape including an end face with an insertion slot formed therein for inserting a time card therethrough;
   - a mounting portion integrally connected to said end face in an inclined state; and
   - a panel removably fitted to said mounting portion and including an indicator and an operation apparatus mounted thereon, said panel being shiftable in its direction at 180°, so that the recorder main body can be used both in vertical and horizontal states.

2. A time recorder for both vertical and horizontal use according to claim 1 further including a ten key bracket disposed under said panel in a superposed relation with respect to each other and said bracket is provided with an indicator and an operation apparatus.

3. A time recorder for both vertical and horizontal use according to claim 1, wherein said recorder main body further includes a base, and four foot rubbers are attached at every four corners of said base.

* * * * *